US012623775B2

(12) United States Patent
Mori et al.

(10) Patent No.: US 12,623,775 B2
(45) Date of Patent: May 12, 2026

(54) ROTORCRAFT AND ROTOR BLADE

(71) Applicant: EXEDY Corporation, Neyagawa (JP)

(72) Inventors: Kouzou Mori, Neyagawa (JP);
Yasunori Kunisaki, Neyagawa (JP);
Tatsuki Kitada, Neyagawa (JP);
Masahiro Ohno, Neyagawa (JP)

(73) Assignee: EXEDY CORPORATION, Neyagawa
(JP)

( * ) Notice: Subject to any disclaimer, the term of this
patent is extended or adjusted under 35
U.S.C. 154(b) by 78 days.

(21) Appl. No.: 19/042,704

(22) Filed: Jan. 31, 2025

(65) Prior Publication Data

US 2025/0276789 A1 Sep. 4, 2025

(30) Foreign Application Priority Data

Feb. 29, 2024 (JP) ................................. 2024-029525

(51) Int. Cl.
*B64C 27/46* (2006.01)
*B64C 27/467* (2006.01)
*B64U 10/14* (2023.01)
*B64U 30/29* (2023.01)

(52) U.S. Cl.
CPC .......... *B64C 27/463* (2013.01); *B64C 27/467*
(2013.01); *B64U 30/29* (2023.01); *B64U 10/14*
(2023.01)

(58) Field of Classification Search
CPC ...... B64C 27/46; B64C 27/463; B64C 27/467
See application file for complete search history.

(56) References Cited

U.S. PATENT DOCUMENTS

| | | | | |
|---|---|---|---|---|
| 5,199,851 A | * | 4/1993 | Perry .................... | B64C 27/463 |
| | | | | 416/243 |
| 5,584,661 A | * | 12/1996 | Brooks ................. | B64C 27/467 |
| | | | | 416/238 |
| 5,992,793 A | * | 11/1999 | Perry .................... | B64C 27/463 |
| | | | | 244/17.11 |
| 2012/0251326 A1 | * | 10/2012 | Schimke ............... | B64C 27/467 |
| | | | | 416/210 R |

FOREIGN PATENT DOCUMENTS

JP          2023184048 A     12/2023

* cited by examiner

*Primary Examiner* — Timothy D Collins

(74) *Attorney, Agent, or Firm* — United IP Counselors,
LLC

(57) ABSTRACT

The disclosed rotorcraft includes a rotor blade and a prime
mover. The rotor blade extends in a radial direction. The
prime mover is configured to rotate the rotor blade. The rotor
blade includes a blade body and a blade end portion. The
blade end portion is disposed on an outer side of the blade
body in the radial direction. The blade end portion includes
a leading edge (i.e., an edge facing the rotational direction)
that tilts in a rotational direction to the outer side in the radial
direction. The disclosed configuration reduces noise pro-
duced by the rotorcraft.

14 Claims, 7 Drawing Sheets

ROTORCRAFT AND ROTOR BLADE

CROSS-REFERENCE TO RELATED APPLICATIONS

This application is based on and claims the priority benefit of application No. 2024-029525 filed on Feb. 29, 2024, the contents of which are incorporated herein by reference.

TECHNICAL FIELD

The claimed invention relates to a rotorcraft and a rotor blade.

BACKGROUND

Rotorcraft such as industrial drones have become ubiquitous in recent years. For example, a drone described in Japan Laid-open Patent Application Publication No. 2023-184048 includes rotor blades and motors for rotating the rotor blades.

SUMMARY OF THE INVENTION

The rotorcraft described above has a drawback that noise is produced by the rotation of rotor blades. In view of this, it is an object of the claimed invention to provide a rotorcraft in which the production of noise can be reduced.

A rotorcraft according to a first aspect includes a rotor blade and a prime mover. The rotor blade extends in a radial direction. The prime mover is configured to rotate the rotor blade. The rotor blade includes a blade body and a blade end portion. The blade end portion is disposed on an outer side of the blade body in the radial direction. The blade end portion includes a leading edge angled in a rotational direction to the outer side in the radial direction. It should be noted that the leading edge of the blade end portion refers to an edge facing the rotational direction.

According to this configuration, the leading edge of the blade end portion of the rotor blade is angled in the rotational direction to the outer side in the radial direction; hence, a pressure acting on the upper surface of the blade end portion can be increased in magnitude. Because of this, a difference between the pressure acting on the lower surface and that acting on the upper surface in the blade end portion is made small, whereby generation of a vortex flowing around the blade end portion from the lower surface to the upper surface can be inhibited. As a result, the generation of blade end vortex can be inhibited, whereby production of noise due to the rotation of the rotor blade can be reduced.

A rotorcraft according to a second aspect relates to the rotorcraft according to the first aspect and is configured as follows. The blade body includes at least one protrusion protruding in the rotational direction. According to this configuration, a vortex, generated behind the blade body can be inhibited from growing by the at least one protrusion.

A rotorcraft according to a third aspect relates to the rotorcraft according to the first or second aspect and is configured as follows. The blade end portion is angled upward to the outer side in the radial direction.

A rotor blade according to a fourth aspect is configured to be rotated in a rotational direction. The rotor blade includes a blade body and a blade end portion. The blade end portion is disposed on an outer side of the blade body in a radial direction. The blade end portion includes a leading edge that is angled in the rotational direction to the outer side in the radial direction. It should be noted that the leading edge of the blade end portion refers to an edge facing the rotational direction.

Overall, according to the claimed invention, production of noise can be reduced.

BRIEF DESCRIPTION OF THE DRAWINGS

FIG. 9 is a diagram showing distribution of pressure acting on another configuration of a rotor blade in which the blade end portion thereof is increased in length as compared to a rotor blade for which FIG. 6 shows pressure distribution.

FIG. 10 is a diagram showing a distribution of pressure acting on another configuration of rotor blade in which the blade end portion thereof is reduced in length as compared to a rotor blade for which FIG. 6 shows pressure distribution.

FIG. 11 is a diagram showing a distribution of pressure acting on another configuration of rotor blade obtained by tilting the blade end portion only at the leading edge thereof in a rotor blade for which FIG. 7 shows pressure distribution.

DETAILED DESCRIPTION

A rotorcraft 100 having rotor blades 3 according to a presently preferred embodiment of the claimed invention will be hereinafter explained with reference to the drawings. It should be noted that in the following explanation, the term "axial direction" refers to an extending direction of a rotational axis O of the rotor blade 3. On the other hand, the term "circumferential direction" refers to a circumferential direction of an imaginary circle about the rotational axis O, whereas the term "radial direction" refers to a radial direction of the imaginary circle about the rotational axis O.

Figure 1:
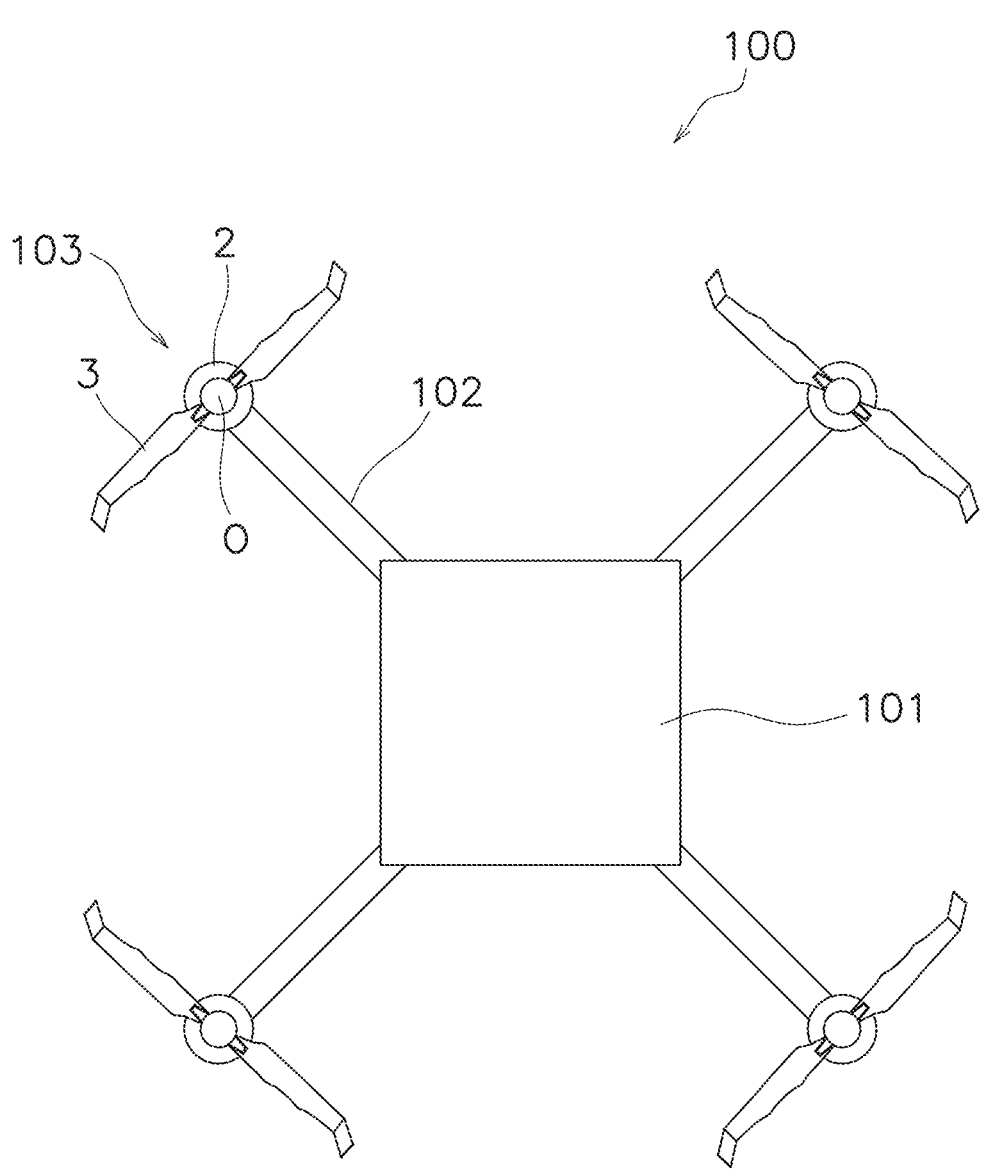
FIG. 1 is a plan view of an embodiment of a rotorcraft in accordance with the claimed invention.

As shown in FIG. 1, the rotorcraft 100 includes multiple electric motors 2 (each of which is an exemplary prime mover) and multiple rotor blades 3. When described in detail, the rotorcraft 100 includes a body 101, multiple arms 102, and multiple rotors 103. For example, each rotor 103 includes a single electric motor 2 and a plurality of rotor blades 3 attached to the electric motor 2. It should be noted that in the presently preferred embodiment, the rotorcraft 100 includes four rotors 103. In other words, in the presently preferred embodiment, the rotorcraft 100 is a drone of a multi-copter type. Additionally, each rotor 103 includes two rotor blades 3.

The body 101 includes a battery (omitted in illustration), a control unit (omitted in illustration), and so forth. The arms 102 extend from the body 101 in a radial direction. Each rotor 103 is attached to the distal end of one of the arms 102.

The electric motors 2 are configured to rotate the rotor blades 3. It should be noted that the rotational direction of each electric motor 2 is uniquely set. For example, in FIG. 1, the electric motor 2 in the right upper rotor 103 and that in the left lower rotor 103 are rotated clockwise as viewed from above, whereas the electric motor 2 in the left upper rotor 103 and that in the right lower rotor 103 are rotated counterclockwise as viewed from above.

Figure 2:
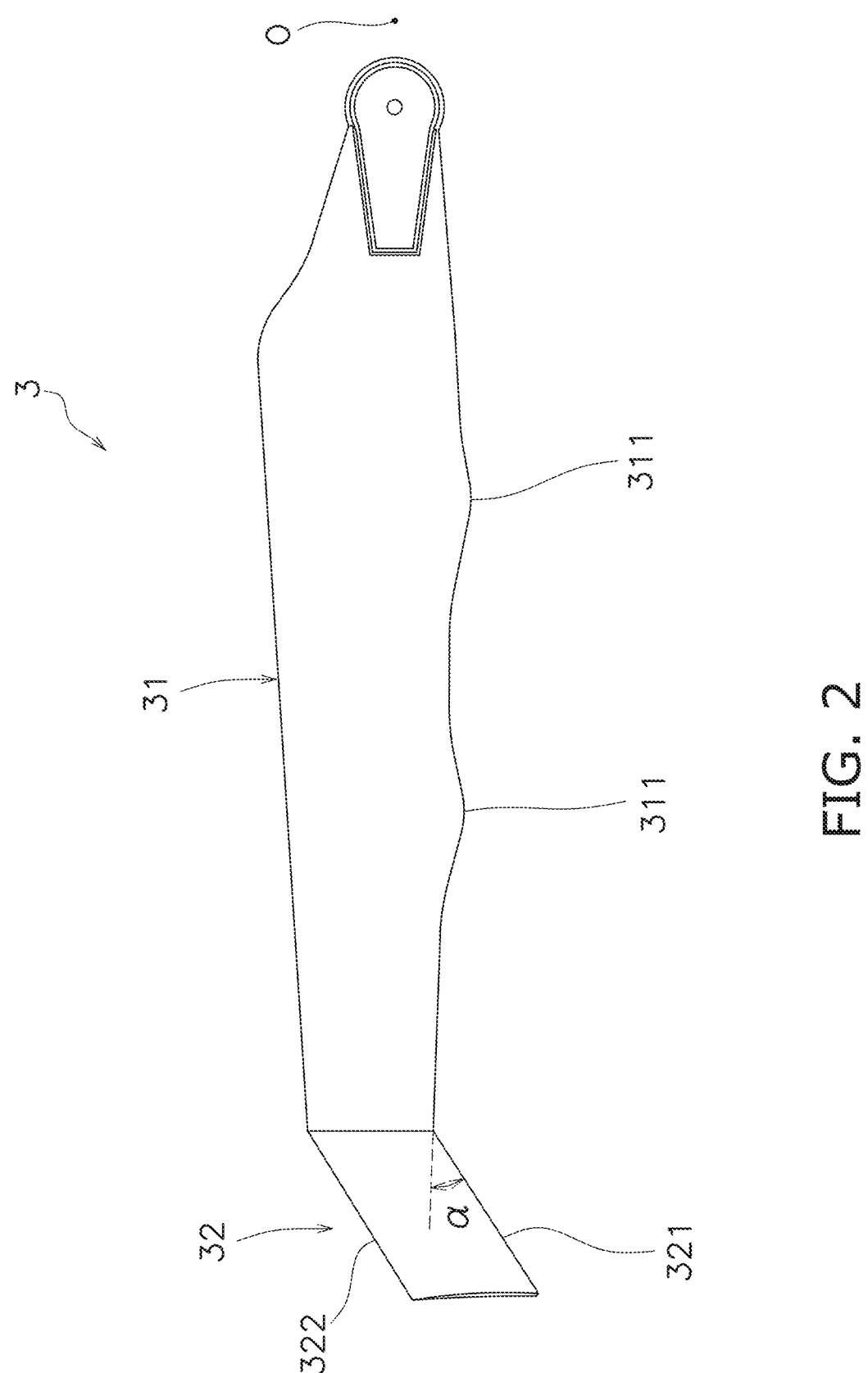
FIG. 2 is a plan view of a rotor blade used in the rotorcraft illustrated in FIG. 1.
Figure 3:
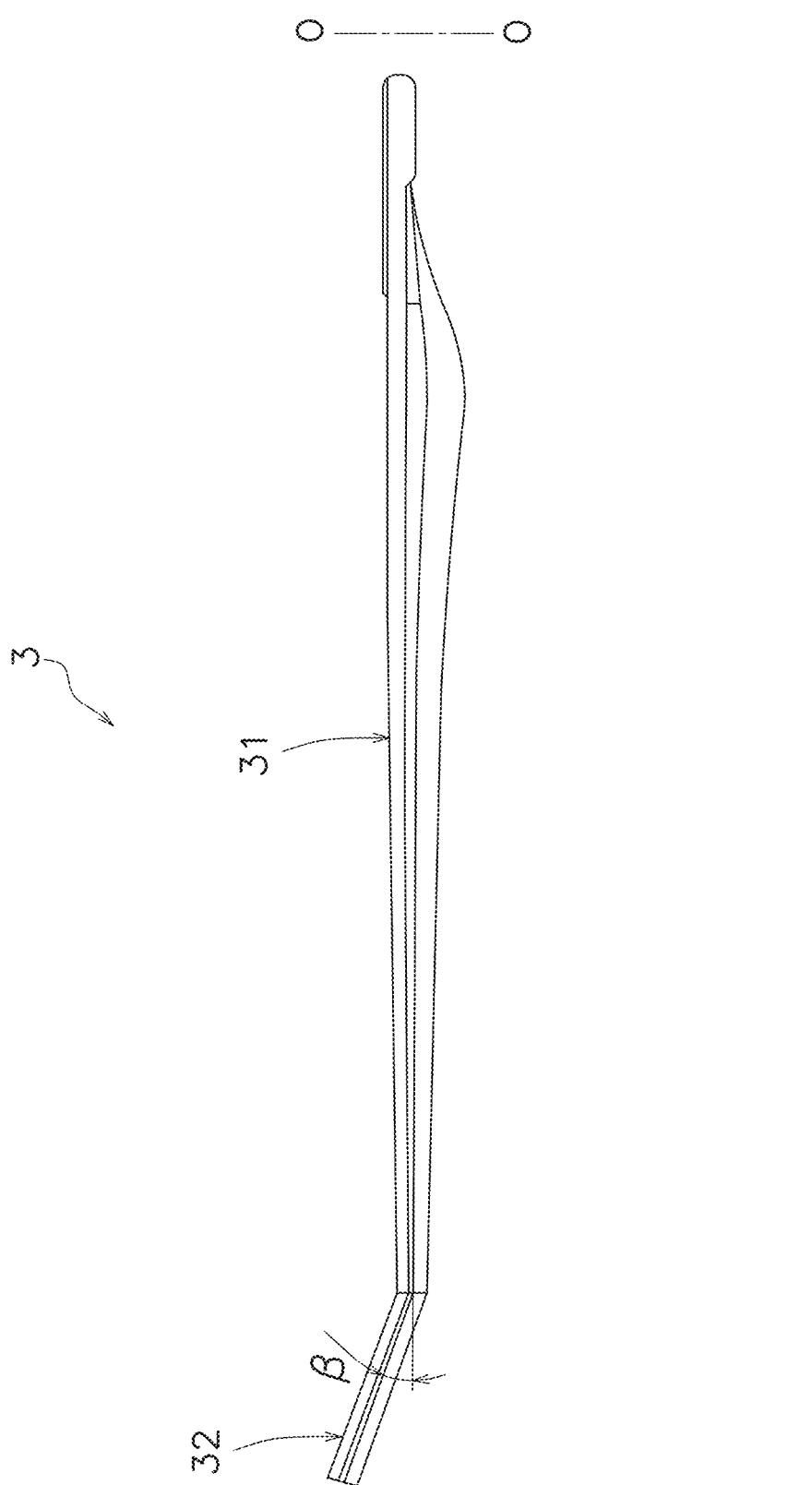
FIG. 3 is a front view of the rotor blade (i.e. a view of the rotor blade leading edge).

FIG. 2 is a plan view of one of the rotor blades 3 as seen from above, whereas FIG. 3 is a front view of the rotor blade 3 (i.e., a view looking at the leading edge of the rotor blade 3, as viewed in the rotational direction). As shown in FIGS. 2 and 3, the rotor blade 3 extends in the radial direction. When described in detail, the rotor blade 3 extends from a center part to an outer side in the radial direction (i.e., a blade tip portion). It should be noted that the center part refers to a part in which the rotational center of the rotor blade 3 is located. In FIG. 2, the rotor blade 3 is rotated counterclockwise about the rotational axis O. In other words, in FIG. 2, the rotational direction of the rotor blade 3 is the counterclockwise direction.

The rotor blade 3 includes a blade body 31 and a blade end portion 32 as well as a proximal end connected to the electric motor 2 and a distal end opposite the proximal end. The distal end has a distal point being a point farthest from the rotational axis O and a distal edge that extends from one side of the blade body 31 to another side of the blade body 31 with the distal point lying on the distal edge. The blade body 31 extends in the radial direction. When described in detail, the blade body 31 extends from the center part to the outer side in the radial direction. The rotor blade 3 is not particularly limited in material but can, for example, be made of a composite material (e.g., CFRP), aluminum alloy, and so forth.

As shown in FIG. 2, the leading edge of the blade body 31 includes multiple protrusions 311 protruding in the rotational direction. In FIG. 2, the rotational direction of the rotor blade 3 is oriented downward; hence, the protrusions 311 protrude downward as shown on the drawing sheet. It should be noted that in the presently preferred embodiment, the blade body 31 includes two protrusions 311; however, there may be more or less than two protrusions 311.

The protrusions 311 are spaced apart from each other at an interval in the radial direction. The protrusions 311 are also spaced apart from the blade end portion 32. Each protrusion 311 is curved at the distal end thereof, i.e., the lower end thereof in FIG. 2. It should be noted that each protrusion 311 may be pointed without being curved at the distal end thereof. Besides, each protrusion 311 protrudes in a generally triangular shape; however, the protruding shape of each protrusion 311 is not limited to the triangular shape. For example, the protruding shape of each protrusion 311 may be a rectangular shape, or alternatively, a semicircular shape.

The blade end portion 32 is disposed on the outer side of the blade body 31 in the radial direction (i.e., at the tip of the blade). The blade end portion 32 has a leading edge 321 that is angled forward in the rotational direction toward the radially outer side of the blade. In other words, the leading edge 321 of the blade end portion 32 angles to face both the rotational direction and the inner side in the radial direction.

Specifically, in FIG. 2, the leading edge 321 of the blade end portion 32 extends to angle left down toward the distal end thereof. In other words, a proximal end of the leading edge 321 extends from the blade body and a distal end of the leading edge 321 is opposite the proximal end of the leading edge. The entirety of the leading edge 321 is angled forwardly in the rotational direction with a forward sweep angle such that the distal end of the leading edge 321 and the distal edge of the rotor blade 3 have a shared point. The leading edge 321 may be straight. It should be noted that the leading edge 321 of the blade end portion 32 refers to an edge facing the rotational direction in the blade end portion 32. Alternatively stated, the blade end portion 32 is forward swept relative to the blade body 31.

A sweep angle of the leading edge 321, shown as a first sweep angle α, is not particularly limited in magnitude, but it may, for example, be set to be about 10° to 50°. It should be noted that the first sweep angle α of the leading edge 321 of the blade end portion 32 is defined as an angle with respect to the leading edge of the blade body 31. In other words, the leading edge 321 of the blade end portion 32 is angled forward with respect to the leading edge of the blade body 31, as seen from above.

The blade end portion 32 has a trailing edge 322 that is also angled in the rotational direction to the outer side in the radial direction. In other words, the trailing edge 322 of the blade end portion 32 angles in an identical direction to the leading edge 321. It should be noted that the trailing edge 322 of the blade end portion 32 may not angle or, alternatively, it may angle in the opposite direction, i.e., away from the direction in which the blade advances into the air. The trailing edge 322 is straight in this embodiment.

As shown in FIG. 3, the blade end portion 32 angles upwardly to the outer side in the radial direction. A second, dihedral angle β of the blade end portion 32 is not particularly limited in magnitude but can, for example, be about 5° to 25°. It should be noted that the second, dihedral angle β of the blade end portion 32 is measured at the leading edge 321. The blade end portion 32 may not be angled in the up-and-down direction (0 dihedral), or alternatively, may be angled downwardly (negative dihedral).

MODIFICATIONS

One preferred embodiment of the claimed invention has been explained above. However, the claimed invention is not limited to the above, and a variety of changes can be made without departing from the scope of the claimed invention. It should be noted that basically speaking, respective modifications to be described may be applicable simultaneously to the extent they are not mutually exclusive.

(a) In the preferred embodiment described above, the drone of the multi-copter type has been exemplified as the rotorcraft 100; however, the rotorcraft 100 is not limited to this. For example, the rotorcraft 100 may be a helicopter.

(b) The number of rotor blades 3 and that of rotors 103 are not limited to those in the preferred embodiment described above.

(c) In the preferred embodiment described above, each electric motor 2 has been exemplified as the prime mover; however, the prime mover may be an internal combustion engine or so forth.

PRACTICAL EXAMPLES

A practical example and comparative examples will be hereinafter described for further specifically explaining the claimed invention. It should be noted that the claimed invention is not limited to the practical example to be described.

Figure 4:
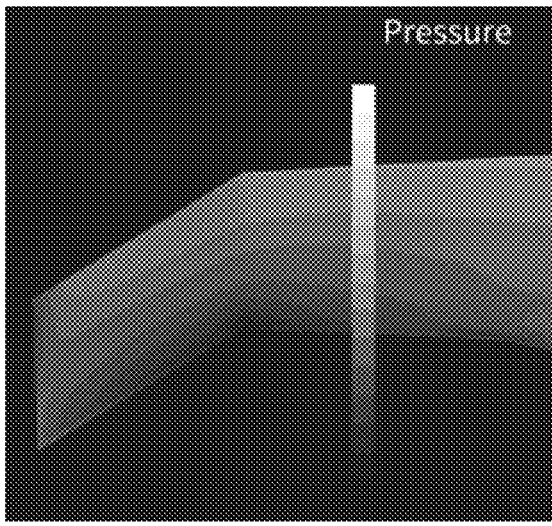
FIG. 4 is a diagram showing distribution of pressure acting on a configuration of a rotor blade, in which a first, sweep angle $\alpha$ is 30° and a second, dihedral angle $\beta$ is 0°.
Figure 5:
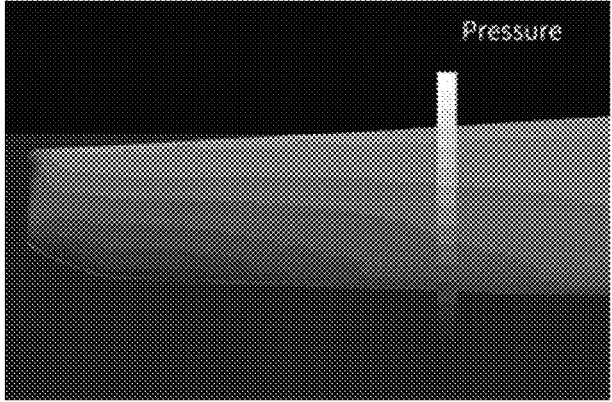
FIG. 5 is a diagram showing distribution of pressure acting on another configuration of a rotor blade, in which the first, sweep angle $\alpha$ is 0° and the second, dihedral angle $\beta$ is 0°.

Fluid-dynamics analysis was conducted for one configuration of the rotor blade 3 in which the forward sweep angle α of the blade end portion 32 was set to be 30° and another configuration of the rotor blade 3 in which the forward sweep angle α of the blade end portion 32 was set to be 0°; then, pressure distributions were calculated for both configurations. The results are shown in FIGS. 4 and 5. It should be noted that FIG. 4 shows the pressure distribution where the sweep angle α is 30°, whereas FIG. 5 shows the pressure distribution where the sweep angle α is 0°. In FIGS. 4 and 5, conditions other than the sweep angle α were substantially identical and the dihedral angle β was set to be 0°. FIGS. 4 and 5 are plan views of the configurations of the blade end portion 32 seen from above. Besides, in FIGS. 4 and 5, the pressure reduces in magnitude with increase in darkness of color. In the fluid-dynamics analysis, K-E turbulence model was employed in software used for versatile thermal fluid analysis; besides, the rotational speed was set to be 3000 rpm.

When FIGS. 4 and 5 are compared, it can be seen that the pressure acting on the edge of the radially outer end of the blade end portion 32 is higher in FIG. 4 than in FIG. 5. In other words, it is shown that a difference between the pressure acting on the lower surface and that acting on the upper surface in the blade end portion 32 is smaller in FIG. 4 than in FIG. 5, whereby a blade end vortex is more inhibited from being generated in FIG. 4 than in FIG. 5.

As a result of the above, it can be understood that, when the leading edge 321 of the blade end portion 32 is angled forwardly in the rotational direction to the outer side in the radial direction, the generation of blade end vortex can be inhibited, whereby production of noise can be reduced.

Figure 6:
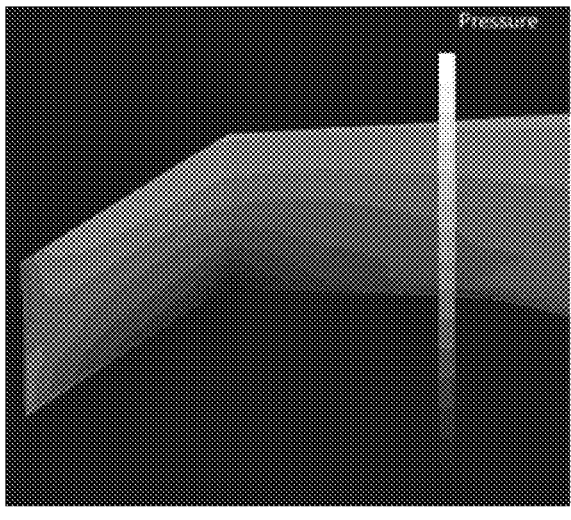
FIG. 6 is a diagram showing distribution of pressure acting on another configuration of a rotor blade, in which the first, sweep angle $\alpha$ is 30° and the second, dihedral angle $\beta$ is 15°.
Figure 7:
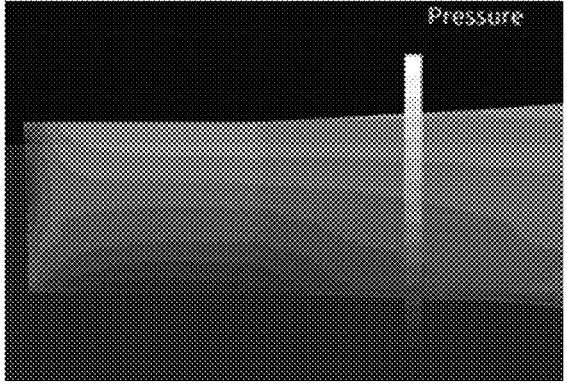
FIG. 7 is a diagram showing distribution of pressure acting on another configuration of a rotor blade, in which the first, sweep angle $\alpha$ is 0° and the second, dihedral angle $\beta$ is 15°.
Figure 8:
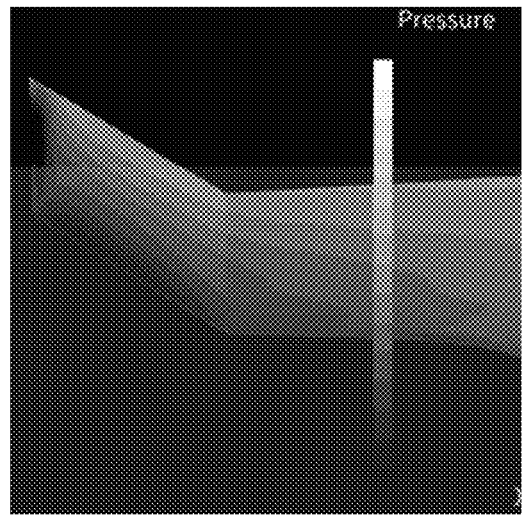
FIG. 8 is a diagram showing distribution of pressure acting on another configuration of a rotor blade, in which the first, sweep angle $\alpha$ is −30° and the second, dihedral angle $\beta$ is 15°.

Next, fluid-dynamics analysis was conducted in comparable manner to the above with respect to one configuration of the rotor blade 3 in which the sweep angle α of the blade end portion 32 was set to be 30°, another configuration of the rotor blade 3 in which the sweep angle α of the blade end portion 32 was set to be 0°, and yet another configuration of the rotor blade 3 in which the sweep angle α of the blade end portion 32 was set to be –30° (i.e., a rearward sweep); then, pressure distributions were calculated for the configurations. The results are shown in FIGS. 6, 7, and 8. It should be noted that FIG. 6 shows the pressure distribution where the sweep angle α is 30°; FIG. 7 shows the pressure distribution where the sweep angle α is 0°; FIG. 8 shows the pressure distribution where the sweep angle α is –30°. In FIGS. 6 to 8, conditions other than the sweep angle α were substantially identical and the dihedral angle β was set to be 15°. FIGS. 6 to 8 are plan views of the configurations of the blade end portion 32 as seen from above. Besides, in FIGS. 6 to 8, the pressure reduces in magnitude with increase in darkness of color.

When FIGS. 6 and 7 are compared, it is seen that the pressure acting on the edge of the radially outer end of the blade end portion 32 is higher in FIG. 6 than in FIG. 7. In other words, it is seen that the difference between the pressure acting on the lower surface and that acting on the upper surface in the blade end portion 32 is smaller in FIG. 6 than in FIG. 7, whereby the generation of blade end vortex is more inhibited for a blade configuration yielding the pressure distribution shown in FIG. 6 than for a blade configuration yielding the pressure distribution shown in FIG. 7.

On the other hand, when FIGS. 7 and 8 are compared, it is seen that the pressure acting on the edge of the radially outer end of the blade end portion 32 is higher in FIG. 8 than in FIG. 7. In other words, it is seen that the difference between the pressure acting on the lower surface and that acting on the upper surface in the blade end portion 32 is larger in FIG. 8 than in FIG. 7, whereby the blade end vortex is more likely to be generated with a blade configuration yielding the pressure distribution shown in FIG. 8 than with a blade configuration yielding the pressure distribution shown in FIG. 7.

As a result of the above, it can be understood that, even if the dihedral angle β of the blade end portion 32 is set to be 15°, when the leading edge 321 of the blade end portion 32 is angled forwardly in the rotational direction to the outer side in the radial direction, the generation of blade end vortex can be inhibited, whereby the production of noise can be reduced.

Incidentally, when FIGS. 4 and 6 are compared, it is seen that the pressure acting on the edge of the radially outer end of the blade end portion 32 is higher in FIG. 6 than in FIG. 4. In other words, it is seen that the difference between the pressure acting on the lower surface and that acting on the upper surface in the blade end portion 32 is smaller in FIG. 6 than in FIG. 4, whereby the generation of blade end vortex is more inhibited for a blade configuration yielding the pressure distribution shown in FIG. 6 than for a blade configuration yielding the pressure distribution shown in FIG. 4. Simply put, it can be understood that, when the blade end portion 32 is angle upwardly (i.e., has a positive dihedral angle), the generation of blade end vortex is more inhibited. It should be noted that in FIGS. 4 and 6, conditions other than the dihedral angle β were identical.

Figure 9:
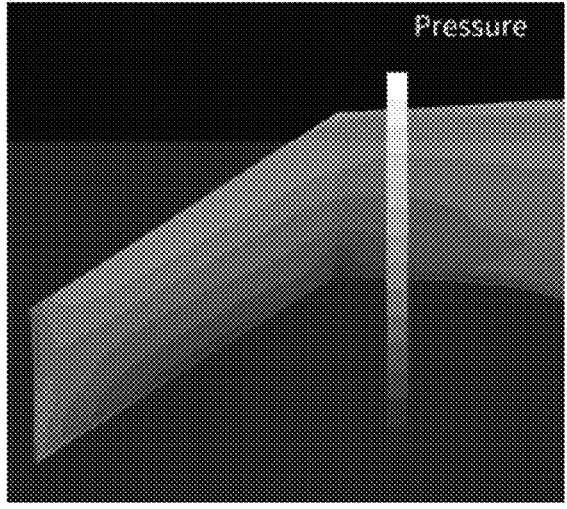
Figure 10:
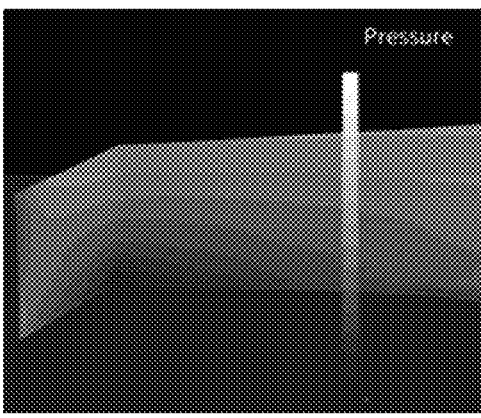

FIG. 9 shows a pressure distribution in one configuration of the rotor blade 3 in which the blade end portion 32 was set to be 1.07 times as long as that in the configuration of the rotor blade 3 that yield the pressure distribution shown in FIG. 6, whereas FIG. 10 shows a pressure distribution in another configuration of the rotor blade 3 in which the blade end portion 32 was set to be 0.93 times as long as that in the configuration of the rotor blade 3 that yield the pressure distribution shown in FIG. 6. It should be noted that conditions other than the length of the blade end portion 32 were substantially identical among FIGS. 6, 9, and 10. Besides, the pressure distributions were calculated by conducting fluid-dynamics analysis in comparable manner to the above.

When FIG. 7 and FIGS. 9 and 10 are compared, it is seen that, even if the blade end portion 32 is changed in length, when the leading edge 321 of the blade end portion 32 is angled forwardly in the rotational direction to the outer side in the radial direction, the difference between the pressure acting on the lower surface and that acting on upper surface in the blade end portion 32 is made small, whereby the generation of blade end vortex is inhibited.

Figure 11:
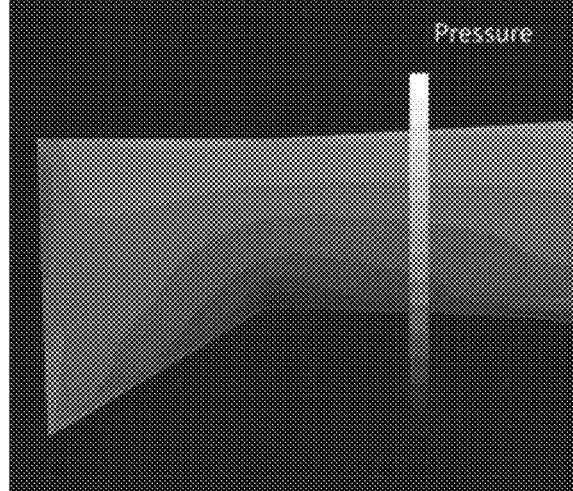

FIG. 11 shows a pressure distribution in a configuration of the rotor blade 3 in which the blade end portion 32 was angled by 30° only at the leading edge 321 without being angled at the trailing edge 322. It should be noted that the dihedral angle β of the blade end portion 32 was set to be 15°. It should be also noted that conditions other than the shape of the leading edge 321 of the blade end portion 32 in FIG. 11 were substantially identical to those in FIG. 7. Besides, the pressure distributions were calculated by conducting fluid-dynamics analysis in comparable manner to the above.

When FIGS. 7 and 11 are compared, it is seen that the pressure acting on the edge of the radially outer end of the blade end portion 32 is higher in FIG. 11 than in FIG. 7. In other words, it is seen that the difference between the pressure acting on the lower surface and that acting on the upper surface in the blade end portion 32 is smaller for a blade configuration yielding the pressure distribution shown in FIG. 11 than for a blade configuration yielding the pressure distribution shown in FIG. 7, whereby the generation of blade end vortex is more inhibited in FIG. 11 than in FIG. 7. Simply put, it can be understood that the generation of blade end vortex is more inhibited even by angling only the leading edge 321 of the blade end portion 32 in the rotational direction (i.e., forward sweep).

LIST OF REFERENCE NUMERALS

2: Electric motor, 3: Rotor blade, 31: Blade body, 311: Protrusion, 32: Blade end portion, 321: Leading edge, 100: Rotorcraft

The invention claimed is:

1. A rotorcraft, comprising:
   a rotor blade extending in a radial direction the rotor blade having a proximal end and a distal end opposite the proximal end; and
   a prime mover configured to rotate the rotor blade and being configured to be connected to the proximal end,
   wherein the rotor blade includes a blade body and a blade end portion disposed at a radially outer end of the blade body, the distal end having a distal point being a point farthest from a rotational axis of the rotor blade and a distal edge extending from one side of the blade body to another side of the blade body with the distal point lying on the distal edge, and
   the blade end portion includes a leading edge facing forward in a rotational direction, a proximal end of the leading edge extending from the blade body and a distal end of the leading edge opposite the proximal end of the leading edge, the entirety of the leading edge being angled forwardly in the rotational direction with a forward sweep angle such that the distal end of the leading edge and the distal edge of the rotor blade have a shared point.

2. The rotorcraft according to claim 1, wherein a leading edge of the blade body includes at least one protrusion protruding forwardly in the rotational direction.

3. The rotorcraft according to claim 1, wherein the blade end portion is angled upwardly with a positive dihedral angle relative to the blade body.

4. A rotor blade configured to be rotated in a rotational direction, the rotor blade comprising:
   a blade body;
   a proximal end being configured to be attached to a prime mover;
   a distal end being opposite the proximal end, the distal end having a distal point being a point farthest from a rotational axis of the rotor blade and a distal edge extending from one side of the blade body to another side of the blade body with the distal point lying on the distal edge; and
   a blade end portion disposed at a radially outer end of the blade body, wherein the blade end portion includes a leading edge facing forward in the rotational direction, a proximal end of the leading edge extending from the blade body and a distal end of the leading edge opposite the proximal end of the leading edge, the entirety of the leading edge being angled forwardly in the rotational direction with a forward sweep angle such that the distal end of the leading edge and the distal edge of the rotor blade have a shared point.

5. The rotorcraft according to claim 1, wherein the blade end portion has a trailing edge opposite the leading edge, the trailing edge angles in an identical direction to the leading edge.

6. The rotorcraft according to claim 5, wherein the trailing edge and the leading edge are straight.

7. The rotorcraft according to claim 2, wherein the least one protrusion is spaced apart from the blade end portion.

8. The rotorcraft according to claim 7, wherein the blade body comprises more than one protrusion.

9. The rotor blade according to claim 4, wherein a leading edge of the blade body includes at least one protrusion protruding forwardly in the rotational direction.

10. The rotor blade according to claim 4, wherein the blade end portion is angled upwardly with a positive dihedral angle relative to the blade body.

11. The rotor blade according to claim 4, wherein the blade end portion has a trailing edge opposite the leading edge, the trailing edge angles in an identical direction to the leading edge.

12. The rotor blade according to claim 11, wherein the trailing edge and the leading edge are straight.

13. The rotor blade according to claim 9, wherein the least one protrusion is spaced apart from the blade end portion.

14. The rotor blade according to claim 13, comprising more than one protrusion.

* * * * *